(12) United States Patent  
Beil et al.

(10) Patent No.: US 12,025,042 B2  
(45) Date of Patent: Jul. 2, 2024

(54) INTERNAL COMBUSTION ENGINE FOR A MOTOR VEHICLE, AND MOTOR VEHICLE

(71) Applicant: Mercedes-Benz Group AG, Stuttgart (DE)

(72) Inventors: Heiko Beil, Stuttgart (DE); Rene Ernst, Leimersheim (DE); Siegfried Mueller, Ingersheim (DE); Michael Heinrichsmeyer, Steinheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/040,512

(22) PCT Filed: Jul. 21, 2021

(86) PCT No.: PCT/EP2021/070313  
§ 371 (c)(1),  
(2) Date: Feb. 3, 2023

(87) PCT Pub. No.: WO2022/028886  
PCT Pub. Date: Feb. 10, 2022

(65) Prior Publication Data  
US 2023/0287817 A1    Sep. 14, 2023

(30) Foreign Application Priority Data  
Aug. 5, 2020    (DE) .................... 10 2020 004 716.5

(51) Int. Cl.  
*F01N 3/20* (2006.01)  
*F01N 3/32* (2006.01)  
(Continued)

(52) U.S. Cl.  
CPC ......... *F01N 3/2013* (2013.01); *F01N 3/2033* (2013.01); *F01N 3/323* (2013.01);  
(Continued)

(58) Field of Classification Search  
CPC ...... F01N 3/2013; F01N 3/2033; F01N 3/323; F01N 2240/16; F02M 26/03; F02M 26/06;  
(Continued)

(56) References Cited

U.S. PATENT DOCUMENTS 4,215,550 A * 8/1980 Dinger .................... F02B 37/24  
  60/605.2  
6,276,139 B1    8/2001 Moraal et al.  
(Continued)

FOREIGN PATENT DOCUMENTS

DE    10 2015 015 794 A1    8/2016  
DE    10 2017 213 004 A1    1/2019  
(Continued)

OTHER PUBLICATIONS

English-language Japanese Office Action issued in Japanese Application No. 2023-506186 dated Dec. 19, 2023 (4 pages).  
(Continued)

*Primary Examiner* — Loren C Edwards  
(74) *Attorney, Agent, or Firm* — Crowell & Moring LLP

(57) ABSTRACT

An internal combustion engine for a motor vehicle includes an output shaft, an intake manifold, an exhaust manifold, an exhaust gas aftertreatment device disposed in the exhaust manifold, a heating element disposed in the exhaust manifold upstream of the exhaust gas aftertreatment device, an electrically assisted exhaust gas turbocharger, and a conduit element that extends inside the exhaust gas turbocharger and through which a heating medium is flowable. Via the conduit  
(Continued)

element at least a part of the heating medium is guidable through the exhaust gas turbocharger from the intake manifold into the exhaust manifold.

8 Claims, 1 Drawing Sheet

(51) Int. Cl.
*F02B 37/10* (2006.01)
*F02B 37/16* (2006.01)
*F02B 39/10* (2006.01)
*F02M 26/03* (2016.01)
*F02M 26/06* (2016.01)

(52) U.S. Cl.
CPC ............ *F02B 37/10* (2013.01); *F02B 37/168* (2013.01); *F02B 39/10* (2013.01); *F02M 26/03* (2016.02); *F02M 26/06* (2016.02); *F01N 2240/16* (2013.01); *Y02A 50/20* (2018.01); *Y02T 10/12* (2013.01)

(58) Field of Classification Search
CPC ....... F02M 26/07; F02B 37/10; F02B 37/168; F02B 39/10; Y02A 50/20; Y02T 10/12
See application file for complete search history.

(56) References Cited

U.S. PATENT DOCUMENTS

| | | | |
|---|---|---|---|
| 10,989,084 B2 | | 4/2021 | Laube |
| 2016/0215712 A1* | | 7/2016 | Yokoyama .......... F04D 27/0223 |

FOREIGN PATENT DOCUMENTS

| | | | |
|---|---|---|---|
| DE | 102017213004 A1 * | 1/2019 | |
| DE | 10 2018 003 961 A1 | 11/2019 | |
| DE | 10 2018 129 955 A1 | 5/2020 | |
| EP | 3 020 939 A1 | 5/2016 | |
| JP | 2014-101812 A | 6/2014 | |
| WO | WO 2015/052837 A1 | 4/2015 | |

OTHER PUBLICATIONS

PCT/EP2021/070313, International Search Report dated Sep. 15, 2021 (Two (2) pages).
German-language German Office Action issued in German application No. 10 2020 004 716.5 dated Mar. 12, 2021 (Eight (8) pages).
U.S. Patent Application, "Internal Combustion Engine for a Motor Vehicle, and Motor Vehicle", filed Feb. 3, 2023, Inventor Heiko Beil et al.

* cited by examiner

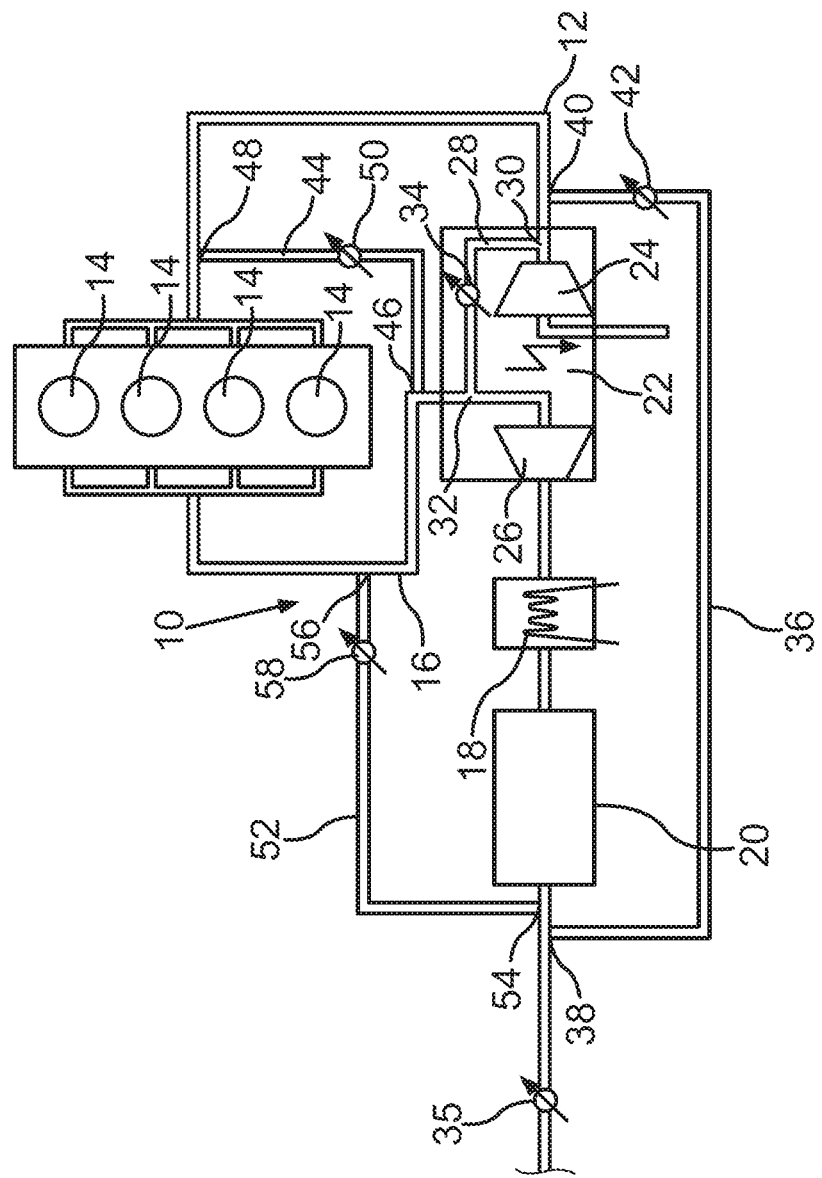

INTERNAL COMBUSTION ENGINE FOR A MOTOR VEHICLE, AND MOTOR VEHICLE

BACKGROUND AND SUMMARY OF THE INVENTION

The invention relates to an internal combustion engine for a motor vehicle. The invention further relates to a motor vehicle.

DE 10 2017 213 004 A1 discloses an internal combustion engine having a combustion motor, a fresh gas train for feeding fresh gas to the combustion motor, an exhaust gas train for removing exhaust gas from the combustion motor, and at least one exhaust gas aftertreatment device integrated into the exhaust gas train. The internal combustion engine further comprises an electrically drivable compressor integrated into the fresh gas train or the exhaust gas train, and a heating device preceding the exhaust gas aftertreatment device or integrated therein for heating up a gas flowing through this heating device. The internal combustion engine has a control device that is formed in such a way that it operates the compressor simultaneously with the heating device when the internal combustion motor is idle as required if the temperature of a component of the internal combustion engine lies below a defined threshold value.

DE 10 2018 129 955 A1 further discloses a method for pre-conditioning an exhaust gas system to remove and purify combustion exhaust gases of a combustion motor, in particular a combustion motor of a motor vehicle, wherein air is heated by a heating element in the exhaust gas system. A flow of hot air is generated with the heated air in the exhaust gas system by a fan, wherein a first catalyst of the exhaust gas system is heated up to a minimum operating temperature by the flow of hot air. Finally, an internal combustion engine for a motor vehicle, with an exhaust gas system through which exhaust gas from the internal combustion engine can flow and in which at least one exhaust gas aftertreatment element for aftertreating the exhaust gas is arranged, can be taken as known from DE 10 2018 003 961 A1.

In addition, an engine system is to be taken as known from EP 3 020 939 A1 which comprises an engine block, an inlet duct for supplying the engine block with fresh air, an outlet duct through which exhaust gas removed from the engine block flows, and an exhaust gas turbocharger which has a turbine arranged in the exhaust duct and a compressor arranged in the inlet duct.

The object of the present invention is to create an internal combustion engine and a motor vehicle, such that an exhaust gas aftertreatment device can be heated up particularly advantageously and particularly quickly.

A first aspect of the invention relates to an internal combustion engine for a motor vehicle that can be driven by the internal combustion engine via an output shaft of the internal combustion engine. The internal combustion engine has at least one combustion chamber and an intake manifold through which air can flow, wherein air can be fed to the combustion chamber via the intake manifold. The internal combustion engine further comprises an exhaust manifold through which an exhaust gas from the combustion chamber can flow, wherein an exhaust gas aftertreatment device is arranged in the exhaust manifold for aftertreating the exhaust gas. At least one heating element for heating a gas flowing through the exhaust manifold is additionally arranged in the exhaust manifold, upstream of the exhaust gas aftertreatment device. The internal combustion engine comprises an electrically assisted exhaust gas turbocharger which has a compressor wheel arranged in the intake manifold as a first impeller for compressing the air flowing through the intake manifold. The electrically assisted exhaust gas turbocharger additionally has a turbine wheel arranged in the exhaust manifold and able to be driven by the exhaust gas as a second impeller, and an electric engine. At least one of the two impellers can be driven in a heating mode for heating up the exhaust gas aftertreatment device by means of the electric engine, whereby in the heating mode, during which combustion processes in the combustion chamber cease and the output shaft is idle, air can be conveyed by means of the at least one impeller into the exhaust manifold as a heating medium. The heating medium can be heated in the heating mode for heating up the exhaust gas aftertreatment device by means of the heating element. The heating medium is thus the or a gas which can be heated or heated up by means of the heating element, for example.

So that the exhaust gas aftertreatment device can now be heated up particularly advantageously and particularly quickly, the internal combustion engine has at least one conduit element that extends inside the exhaust gas turbocharger and through which the heating medium can flow. By means of the conduit element, at least a part of the heating medium can be guided through the exhaust gas turbocharger from the intake manifold into the exhaust manifold. Preferably, at least more than half of the conduit element, in particular the entire conduit element, extends inside the exhaust gas turbocharger. By way of example, the conduit element is fluidically connected at one end, in particular inside the exhaust gas turbocharger, to the intake manifold at a first connection point and at the other end, in particular inside the exhaust gas turbocharger, to the exhaust manifold at a second connection point. It is thereby preferably provided that the entire conduit element extends continuously throughout the exhaust gas turbocharger from the first connection point to the second connection point.

The motor vehicle is preferably designed as a motor car, in particular as a passenger car. The internal combustion engine can be designed as a reciprocating engine and have an engine block which comprises the combustion chamber. A fluid, typically the air, flows into the combustion chamber via the intake manifold. Combustion processes take place in the combustion chamber in a fired operation. A fuel-air mixture is burned in the respective combustion process, whereby the exhaust gas of the internal combustion engine is created. The fuel-air mixture comprises the aforementioned air flowing through the intake manifold and an in particular liquid fuel which is introduced into, in particular directly injected into, the combustion chamber.

The exhaust gas aftertreatment device for aftertreating the exhaust gas is arranged in the exhaust manifold, which can also be referred to in particular as an exhaust gas system. In other words, the exhaust gas aftertreatment device serves as an exhaust gas purification system, in particular by means of at least one catalyst and/or at least one filter, e.g., a particle filter. Pollutants present in the exhaust gas, e.g., carbon monoxide, nitrogen monoxide, nitrogen dioxide and/or unburned hydrocarbons, are converted into harmless materials by means of at least one chemical reaction by means of the catalyst. The catalyst can thus be formed as a three-way catalyst. The catalyst is in particular understood as a component that particularly reduces an activation energy of the chemical reaction, whereby the speed at which the chemical reaction takes place is particularly fast. The activation energy is in particular a quantity of energy required to start the chemical reaction. The reaction speed is in particular a speed at which the chemical reaction takes place. A component that withholds solids from a gas stream or liquid stream is referred to in particular as a filter. Solids or pollutants referred to in particular as particles or soot can thus be filtered out of the exhaust gas.

In order to enable a particularly good purification of the exhaust gas of the internal combustion engine, it is advantageous that the exhaust gas aftertreatment device, in particular the catalyst, has a minimum temperature that can be referred to in particular as a conversion temperature or light-off temperature or onset temperature. For this purpose, in particular in the event of a cold start, it is necessary to heat up the exhaust gas aftertreatment device. A cold start is in particular understood as a start-up, a start, a running or an activation of the internal combustion engine at a temperature of the internal combustion engine which corresponds approximately to the ambient temperature. When the internal combustion engine starts, the internal combustion engine is brought from a state in which combustion processes cease in the combustion chamber and the output shaft is idle, which is also described as engine at a standstill, into an active state, which is referred to in particular as a fired operation. The exhaust gas aftertreatment device is heated up by means of the exhaust gas after the cold start. Particularly in the case of vehicles having a combination of a combustion motor and electric drive, it becomes particularly difficult to heat up the exhaust manifold or keep it warm using the exhaust gas, because in some operating states, a mass flow of the exhaust gas can be extremely low or not present. An electric journey of the motor vehicle, wherein the motor vehicle is at least partially driven by an electric engine during the electric journey is referred to in particular as electric drive.

The heating element arranged in the exhaust manifold upstream of the exhaust gas aftertreatment device can particularly accelerate the heating up of the exhaust gas aftertreatment device, in particular after a cold start. The heating element is formed in such a way that it heats the gas flowing through or around the heating element, e.g., the exhaust gas. The gas is the exhaust gas in a normal operation and/or during the cold start of the internal combustion engine. In the heating mode of the internal combustion engine, which is different to the normal operation, the gas is the air which is heated by means of the heating element, and which is used as a heating medium for warming or heating up the exhaust gas aftertreatment device.

In order to make it possible to heat up the exhaust gas aftertreatment device particularly advantageously and quickly, the conduit element according to the invention that extends at least predominantly or entirely inside the exhaust gas turbocharger and through which the heating medium can flow is provided. In the heating mode, at least a part of the heating medium can be guided by means of the conduit element from the intake manifold through the exhaust gas turbocharger, bypassing the combustion chamber or all combustion chambers of the internal combustion engine, into the exhaust manifold and to the heating element. The heating medium can be conveyed from the intake manifold into the exhaust manifold to the heating element, for example by means of the electric or electrically assisted exhaust gas turbocharger. In this case, at least one of the two impellers is thus driven by means of the electric engine using electrical energy, which can be taken in particular from a power supply device referred to as an on-board power supply system. The heating medium can therefore be conveyed from the intake manifold into the exhaust manifold to the heating element, in particular when the engine is idle. This allows the exhaust gas aftertreatment device to be heated up in a particularly advantageous manner. Conditioning of the exhaust gas aftertreatment device is thus made possible, in particular when the engine is idle. As a result, the internal combustion engine emits very few pollutants, particularly after a cold start.

The internal combustion engine also has an exhaust gas recirculation conduit which is fluidically connected to the exhaust manifold at a branch-off point arranged downstream of the turbine wheel, in particular downstream of the exhaust gas aftertreatment device. The exhaust gas recirculation conduit is additionally fluidically connected to the intake manifold at an introduction point. The introduction point can be arranged in the intake manifold downstream of the compressor wheel. By means of the exhaust gas recirculation conduit, at least a part of the exhaust gas of the branch-off point can be branched off from the exhaust manifold and introduced into the exhaust gas recirculation conduit. The exhaust gas introduced into the exhaust gas recirculation conduit can flow through the exhaust gas recirculation conduit and is guided to the introduction point by means of the exhaust gas recirculation conduit and introduced into the intake manifold at the introduction point, which process can be referred to in particular as low-pressure exhaust gas recirculation. The exhaust gas can thus be guided into the combustion chamber. A portion of exhaust gas already present in the combustion chamber before the combustion process begins can keep a level of pollutants which can be formed in the combustion process particularly low. These can in particular be nitrogen monoxide or nitrogen dioxide, which are both generally referred to in particular as nitrous oxides. At least a part of the heating medium can be guided from the branch-off point to the introduction point, and introduced into the intake manifold at the introduction point in the heating mode, for example. As a result, after flowing through the exhaust gas aftertreatment device, at least a part of the heating medium heated up by the heating element can once again be guided back to the heating element and the exhaust gas aftertreatment device via the conduit element, thereby creating a recirculation circuit. In this way, it is not only the exhaust gas aftertreatment device which is heated, but also other parts of the intake manifold and of the exhaust manifold. As a result, there is a particularly low temperature gradient between the exhaust gas aftertreatment device and its surrounding components of the exhaust manifold, whereby particularly little heat is transported away from the exhaust gas aftertreatment device to the surrounding components of the exhaust manifold. In other words, the exhaust gas aftertreatment device has a particularly low heat loss. This means that heating up the exhaust gas aftertreatment device and keeping it warm can be made particularly efficient. In addition, the heating medium can be brought to a particularly high temperature in a short time, allowing the exhaust gas aftertreatment device to be heated efficiently and effectively. The recirculation circuit can be operated, in particular, when the engine is idle. Conveying the heating medium in the recirculation circuit can be effected, or at least assisted, in particular by means of the electrically driven, at least one impeller. In other words, the recirculation circuit can be maintained by means of the electrically driven, at least one impeller. Conditioning of the exhaust gas aftertreatment device is thus made possible, in particular when the engine is idle. As a result, the internal combustion engine emits very few pollutants, particularly after a cold start.

In an embodiment of the invention, a valve element is arranged in the conduit element, by means of which valve element a quantity of the heating medium flowing through the conduit element can be adjusted. For this purpose, the valve element can be connected to a control device which can be referred to in particular as control member and which is represented by a control unit, for example, or is also referred to as a control unit. The conduit element can be closed only partially or entirely by means of the valve element.

In a further embodiment, the first connection point at which the conduit element is fluidically connected to the intake manifold is arranged upstream or downstream of the compressor wheel. The second connection point at which the conduit element is fluidically connected to the exhaust manifold is alternatively or additionally arranged upstream or downstream of the turbine wheel, the first connection point being upstream of the second connection point. The first connection point and the second connection point can be inside or external to the exhaust gas turbocharger. At least a part of the heating medium that flows through the intake manifold can be branched off at the first connection point, can be guided by means of the conduit element through the exhaust gas turbocharger to the second connection point and can be introduced into the exhaust manifold at the second connection point.

In a further embodiment, an exhaust gas recirculation valve is arranged in the exhaust gas recirculation conduit, by means of which valve a quantity of the exhaust gas and/or of the heating medium flowing through the exhaust gas recirculation conduit can be adjusted. For this purpose, the exhaust gas recirculation valve can be connected to the control device, and can be controlled, and thus operated by the control device. The exhaust gas recirculation conduit can be only partially or completely closed by means of the exhaust gas recirculation valve, for example.

A further embodiment is characterized in that the internal combustion engine has a recirculation conduit which is fluidically connected to the exhaust manifold at a first branching point arranged upstream of the turbine wheel and is fluidically connected to the intake manifold at a second branching point. The second branching point can preferably be arranged downstream of the compressor wheel. By means of the recirculation conduit, for example, at least a part of the exhaust gas flowing through the exhaust manifold can be branched off from the exhaust manifold and introduced into the recirculation conduit. The exhaust gas introduced into the recirculation conduit can flow through the recirculation conduit in a first flow direction, and is thus guided from the first branching point to the second branching point by means of the recirculation conduit, and introduced into the intake manifold at the second branching point, which can be referred to in particular as high-pressure exhaust gas recirculation. At least a part of the heating medium or all of the heating medium can be branched off from the intake manifold at the second branching point and introduced into the recirculation conduit in the heating mode. The exhaust gas introduced into the recirculation conduit can flow through the recirculation conduit in a second flow direction, counter to the first flow direction, and is guided from the second branching point to the first branching point by means of the recirculation conduit. In this case, the heating medium is guided from the intake manifold into the exhaust manifold to the heating element while bypassing the combustion chamber or all the combustion chambers of the internal combustion engine, whereby the heating medium, and consequently the exhaust gas aftertreatment device can be heated up particularly effectively.

In a further embodiment of the invention, a recirculation valve is arranged in the recirculation conduit, by means of which valve a quantity of the exhaust gas and/or of the heating medium that can flow through the recirculation conduit can be adjusted. For this purpose, the recirculation valve can be connected to the control equipment and be controlled by the control equipment. The recirculation conduit can be only partially or entirely closed by means of the recirculation valve, for example.

In a further configuration, the internal combustion engine has at least one recirculation conduit which is fluidically connected to the exhaust manifold at a third connection point arranged downstream of the exhaust gas aftertreatment device and at a fourth connection point arranged upstream of the heating element. By means of the recirculation circuit, at least a part of the heating medium can be branched off from the exhaust manifold at the third connection point, introduced into the recirculation conduit, guided back from the third connection point to the fourth connection point, and reintroduced into the exhaust manifold at the fourth connection point. The heating medium can be conveyed in the exhaust manifold by means of the electrically driven second impeller and circulate in the process, in particular via the recirculation conduit.

In a further embodiment of the invention, a recirculation valve is arranged in the recirculation conduit, by means of which valve a quantity of the heating medium that flows through the recirculation conduit can be adjusted. For this purpose, the recirculation valve can be connected to the control device and can be controlled by the control device. The recirculation conduit can be closed only partially or entirely, for example, by means of the recirculation valve.

It has finally proved particularly advantageous if the heating element has at least one electrical heating element and/or at least one burner and/or at least one electric catalyst. The electrical heating element is in particular understood as a heating element that converts electrical current into heat. A burner is in particular a heating element in which at least one fuel, in particular a liquid or gaseous fuel, is burnt with or without formation of a flame and thus catalytically, in particular while releasing or emitting heat. The electric catalyst is understood in particular as a catalyst which is or can be heated up by means of an electrical heating element, wherein, by way of example, the electrical heating element can be attached to a housing of the catalyst and/or connected to a catalytic or catalytically active structure of the catalyst.

A second aspect of the invention relates to a motor vehicle which has an internal combustion engine according to the invention according to the first aspect of the invention. Advantages and advantageous configurations of the first aspect of the invention should be seen as advantages and advantageous configurations of the second aspect of the invention, and vice versa. The motor vehicle according to the invention is preferably designed as a motor car, in particular as a passenger car or heavy goods vehicle, or as a passenger bus or motorbike.

Further advantages, features and details of the invention result from the following description of preferred exemplary embodiments and with reference to the drawing. The features and combinations of features specified previously in the description and the features and combinations of features specified in the following description of FIGURE and/or shown in the single FIGURE alone, can be used not only in the respectively specified combinations, but also in other combinations or in isolation without leaving the scope of the invention.

BRIEF DESCRIPTION OF THE DRAWING

In the single FIGURE, the drawing shows a schematic illustration of an internal combustion engine according to the invention.

DETAILED DESCRIPTION OF THE DRAWING

The single FIGURE schematically shows an internal combustion engine 10 for a motor vehicle, in particular for a motor car preferably designed as a passenger car. The motor vehicle can be driven by means of the internal combustion engine 10 here. The internal combustion engine 10 has an intake manifold 12, at least one cylinder and an exhaust manifold 16. The cylinder partially delimits a combustion chamber 14. The internal combustion engine 10 has a piston that is received in the cylinder in a translationally movable manner. The piston partially delimits the combustion chamber 14. In the exemplary embodiment depicted in the FIGURE, it is a four-cylinder engine that comprises exactly four combustion chambers 14.

The intake manifold can be flowed through by a fluid in the form of air which is guided into the combustion chamber 14 by means of the intake manifold. Combustion processes occur in the combustion chamber 14 during a fired operation of the internal combustion engine 10, resulting in an exhaust gas of the internal combustion engine 10. The exhaust gas can flow through the exhaust manifold 16, also referred to as an exhaust gas system, and leave the combustion chamber 14 via the exhaust manifold 16. At least one heating element 18 and an exhaust gas aftertreatment device 20 are arranged in the exhaust manifold 16, wherein the heating element 18 is arranged upstream of the exhaust gas aftertreatment device 20. The exhaust gas aftertreatment device 20 comprises at least one element for purifying the exhaust gas. The element for purifying the exhaust gas can for example be formed as an oxidation catalyst, in particular a diesel oxidation catalyst (DOC), an NOx storage catalyst (NSC), an SCR catalyst (selective catalytic reduction catalyst), a diesel particle filter (DPF) or an SCR catalyst on a diesel particle filter (SDPF).

A catalyst that removes carbon monoxide and unburned hydrocarbons from the exhaust gas by means of oxidation with residual oxygen is referred to in particular as an oxidation catalyst. Oxygen molecules that have not been part of a chemical reaction in the combustion processes, and which are thus available as oxygen for further chemical reactions, are referred to in particular as residual oxygen. The NOx storage catalyst (NSC) is in particular understood as a catalyst that has a storage component in which nitrous oxides are chemically bound, and thus removed from the exhaust gas. The nitrous oxides can then be released from the storage components again in an operating state of the internal combustion engine that has a lack of oxygen in the exhaust gas, and be reduced with reducing components such as unburned hydrocarbons or carbon monoxide. A catalyst in which nitrous oxides can be converted in a redox reaction into nitrogen and water using urea from an introduced urea solution is referred to in particular as an SCR catalyst. A diesel particle filter (DPF) is in particular understood as a filter that removes particles that can also be referred to as soot or fine particulates from the exhaust gas.

The internal combustion engine 10 also has an electrical, electrically assisted or electrically assistable exhaust gas turbocharger 22 that has a compressor wheel arranged in the intake manifold 12 as a first impeller 24, a turbine wheel arranged in the exhaust manifold 16 as a second impeller 26 and a shaft. The first impeller 24 and the second impeller 26 are arranged on the shaft and are non-rotatably connected to the shaft. The first impeller 24, the second impeller 26 and the shaft are components formed separately from one another, for example, which are connected to one another in such a manner that relative rotations between the components and movements occurring in the axial direction and in the radial direction of the shaft relative to one another cease or are avoided. The first impeller 24 can be used to condense the air to be fed to the combustion chamber 14 via the intake manifold 12, for example. The exhaust gas flowing from the combustion chamber 14 into the exhaust manifold 16 is expanded by means of the second impeller 26, for example, whereby the second impeller 26 is driven by the exhaust gas. The internal combustion engine 10 further has an electric engine with which the exhaust gas turbocharger 22 can be driven using electrical energy. The electric engine can be formed in such a manner that the shaft drives the exhaust gas turbocharger 22, such that the first impeller 24 and the second impeller 26 are driven by means of the shaft. The electric engine can alternatively be formed in such a manner that the first impeller 24 and/or the second impeller 26 can be directly driven by the electric engine. This should be understood to mean that the shaft is not directly driven by the electric engine. The internal combustion engine 10 also has an output shaft, designed for example as a crankshaft, via which the internal combustion engine can provide torques for driving the motor vehicle, in particular when the internal combustion engine 10 is fired up. When the internal combustion engine 10 is in a heating mode, air is conveyed into the exhaust manifold 16 as a heating medium by means of the electrically assisted exhaust gas turbocharger 22, by at least one of the two impellers 24, 26 being driven electrically by means of the electric engine. Combustion processes cease in the or in all combustion chambers 14 of the internal combustion engine during the heating mode, and the output shaft is idle during the heating mode. In addition, in the heating mode, the heating medium is heated by means of the heating element 18, so that the exhaust gas aftertreatment device 20 is heated or heated up by means of the heated heating medium in the heating mode.

In order to be able to heat up the exhaust gas aftertreatment device 20 particularly advantageously and particularly quickly, the internal combustion engine 10 has at least one conduit element 28 that extends inside the exhaust gas turbocharger 22 and through which the heating medium can flow. By means of the conduit element 28, at least a part of the heating medium can be guided through the exhaust gas turbocharger 22 from the intake manifold 12 into the exhaust manifold 16, bypassing the combustion chamber 14. The heating medium can be conveyed from the intake manifold 12 into the exhaust manifold 16 to the heating element by means of at least one electrically driven impeller (24, 26) of the exhaust gas turbocharger 22. As a result, the exhaust gas aftertreatment device 20 can already be heated up in the case of an idle engine, and can thus be conditioned in a particularly advantageous manner. The internal combustion engine 10 thus has a particularly low level pollutant emissions. The term "idle engine" is to be understood as meaning that no combustion processes occur in the internal combustion engine 10 and the output shaft is at a standstill.

The internal combustion engine 10 has a first connection point 30 and a second connection point 32. The conduit element 28 is fluidically connected to the intake manifold 12 at the first connection point 30 and the connection point 30 is arranged within the exhaust gas turbocharger 22 downstream of the first impeller 24. Alternatively, the first connection point 30 can be arranged, for example, upstream of the first impeller and/or external to the exhaust gas turbocharger 22. This is not shown in the FIGURE. The conduit element 28 is fluidically connected to the exhaust manifold 16 at the second connection point 32, and the connection point 32 is arranged within the exhaust gas turbocharger 22 and upstream of the second impeller 26. Alternatively, the second connection point 32 can be arranged, for example, downstream of the second impeller and/or external to the exhaust gas turbocharger 22. At least a part of the heating medium that flows through the intake manifold 12 can be branched off at the first connection point 30, guided through the exhaust gas turbocharger 22 by means of the conduit element 28 to the second connection point 32, and introduced into the exhaust manifold 16 at the second connection point 32.

A valve element 34 is arranged in the conduit element 28, by means of which a quantity of the heating medium flowing through the conduit element 28 can be adjusted. For this purpose, the valve element 34 can be connected to a control device, which is represented by a control unit, for example.

The internal combustion engine 10 has an exhaust gas recirculation conduit 36. The exhaust gas recirculation conduit 36 is fluidically connected to the exhaust manifold 16 at a branch-off point 38 arranged downstream of the exhaust gas aftertreatment device 20. The exhaust gas recirculation conduit 36 is further fluidically connected to the intake manifold 12 at an introduction point 40. By means of the exhaust gas recirculation conduit 36, in particular during the fired operation, at least a part of the exhaust gas flowing through the exhaust manifold 16 can be guided from the branch-off point 38 to the introduction point 40, and can be introduced into the intake manifold 12 at the introduction point 40. The introduction point is arranged in the intake manifold downstream of the first impeller 24, but can alternatively be arranged upstream of the first impeller 24, which is not depicted in the FIGURE. At least a part of the heating medium can be guided from the branch-off point 38 to the introduction point 40 and introduced into the intake manifold 12 at the introduction point 40 in the heating mode. A first recirculation circuit of the heating medium can thus be represented in the heating mode via the exhaust gas recirculation conduit 36, in which circuit at least a part of the heated up heating medium can be fed to the heating element 18 and the exhaust gas aftertreatment device 20 again by means of the exhaust gas recirculation conduit 36 and by means of the conduit element 28, bypassing the combustion chamber. The heating medium is conveyed via the electrically driven first impeller 24 and/or the electrically driven second impeller 26 of the exhaust gas turbocharger 22. An exhaust gas recirculation valve 42 is arranged in the exhaust gas recirculation conduit 36, by means of which valve a quantity of the exhaust gas and/or of the heating medium that can flow through the exhaust gas recirculation conduit 36 can be adjusted. For this purpose, the exhaust gas recirculation valve 42 can be connected to a control device, which is represented by the control unit, for example. The exhaust gas aftertreatment device 20 can be heated up particularly quickly and efficiently by means of the first recirculation circuit represented via the exhaust gas recirculation conduit 36, as a result of which the internal combustion engine 10 emits very few pollutants.

A mass flow of the exhaust gas and/or the heating medium leaving the internal combustion engine 10 can be reduced or prevented or blocked by means of an exhaust gas valve element 35 which is arranged in the exhaust manifold 16 downstream of the first connection point 30 and is designed, for example, as an exhaust gas flap. The exhaust gas valve element 35 can be connected to a control device which is, e.g., a control unit and can actuate, and thus operate, in particular by open-loop or closed-loop control, the exhaust gas valve element 35, in order to adjust a defined mass flow. By an at least partial closure of the exhaust manifold 16 by means of the exhaust gas valve element 35, it can be ensured that a particularly large quantity of the heating medium flows through the recirculation circuit, i.e., circulates via or along the recirculation circuit. The recirculation circuit comprises the conduit element 28 here, such that the heating medium flowing through the recirculation circuit flows through the conduit element 28, and thus circulates via the conduit element 28. The exhaust gas aftertreatment device 20 can be heated up particularly quickly and effectively via this circulation or recirculation.

The internal combustion engine 10 has a recirculation conduit 44 which is fluidically connected to the exhaust manifold at a first branching point 46 arranged upstream of the second impeller 26, and fluidically connected to the intake manifold 12 at a second branching point 48. The second branching point 48 can preferably be arranged downstream of the first impeller 24. By means of the recirculation conduit 44, at least a part of the exhaust gas can be guided in a first flow direction from the first branching point 46 to the second branching point 48, and can be introduced into the intake manifold 12 at the second branching point 48. In the heating mode, the heating medium can be guided from the second branching point 48 to the first branching point 46 in a second flow direction, counter to the first flow direction, and can be introduced into the exhaust manifold 16 at the first branching point 46. The heating medium is conveyed in this case from the intake manifold to the heating element 18 by means at least of the electrically driven first impeller 24 while bypassing the combustion chamber 14. A recirculation valve 50 is arranged in the recirculation conduit 44, by means of which a quantity of the exhaust gas or of the heating medium able to flow through the recirculation conduit 44 can be adjusted. For this purpose, the recirculation valve 50 can be connected to a control device, represented for example by the control unit.

The heating element 18 can comprise an electric heating element and/or a burner and/or an electrically heatable catalyst.

The internal combustion engine 10 has at least one recirculation conduit 52 which is fluidically connected to the exhaust manifold 16 at a third connection point 54 arranged downstream of the exhaust gas aftertreatment device 20 and at a fourth connection point 56 arranged upstream of the heating element 18, in particular upstream of the turbine wheel 26. By means of the recirculation conduit, at least a part of the heating medium flowing through the exhaust manifold 16 can be branched off from the exhaust manifold 16 at the third connection point 54, guided back to the fourth connection point 56 from the third connection point 54, and introduced into the exhaust manifold 16 at the fourth connection point 56. This represents a second recirculation of the heating medium, since the heating medium is guided back by means of the recirculation conduit from the third connection point 54 to the fourth connection point 56, arranged upstream in relation thereto, and is introduced into the exhaust manifold 16. This recirculation of the heating medium creates a second recirculation circuit in which or via which the heating medium can circulate between the connection points 54, 56. The second recirculation circuit can be operated by means of the electrically driven exhaust gas turbocharger 22, in particular when the engine is idle. The second recirculation circuit can be operated independently of the first recirculation circuit or together with the first recirculation circuit. A recirculation valve 58 is arranged in the recirculation conduit 52, by means of which valve a quantity of the heating medium flowing through the recirculation conduit 52 can be adjusted. For this purpose, the recirculation valve 58 can be connected to a control device, represented for example by a control unit.

LIST OF REFERENCE CHARACTERS 10 internal combustion engine
12 intake manifold
14 combustion chamber
16 exhaust manifold
18 heating element
20 exhaust gas aftertreatment device
22 exhaust gas turbocharger
24 compressor wheel
26 turbine wheel
28 conduit element
30 first connection point
32 second connection point
34 valve element
35 exhaust gas valve element
36 exhaust gas recirculation conduit
38 branch-off point
40 introduction point
42 exhaust gas recirculation valve
44 recirculation conduit
46 first branching point
48 second branching point
50 recirculation valve
52 recirculation conduit
54 third connection point
56 fourth connection point
58 recirculation valve

The invention claimed is:

1. An internal combustion engine (10) for a motor vehicle, comprising:
    an output shaft via which the motor vehicle is drivable by the combustion engine (10);
    an intake manifold (12) through which air to be fed to a combustion chamber (14) of the combustion engine (10) is flowable;
    an exhaust manifold (16) through which an exhaust gas from the combustion chamber (14) is flowable;
    an exhaust gas aftertreatment device (20) disposed in the exhaust manifold (16) for aftertreating the exhaust gas;
    a heating element (18) disposed in the exhaust manifold (16) upstream of the exhaust gas aftertreatment device (20) for heating a gas flowing through the exhaust manifold (16);
    an electrically assisted exhaust gas turbocharger (22) which has a compressor wheel disposed in the intake manifold (12) as a first impeller (24) for compressing air flowing through the intake manifold (12), a turbine wheel as a second impeller (26) which is disposed in the exhaust manifold (16) and which is drivable by the exhaust gas, and an electric engine via which at least one of the first impeller (24) and second impeller (26) is drivable in a heating mode for heating the exhaust gas aftertreatment device (20), wherein in the heating mode, during which combustion processes in the combustion chamber (14) do not take place and the output shaft is idle, air is conveyable as a heating medium by the at least one of the first impeller (24) and second impeller (26) into the exhaust manifold (16) and is heatable by the heating element (18) in the heating mode to heat the exhaust gas aftertreatment device (20);
    a conduit element (28) that extends inside the exhaust gas turbocharger (22) and through which the heating medium is flowable, wherein via the conduit element (28) at least a part of the heating medium is guidable through the exhaust gas turbocharger (22) from the intake manifold (12) into the exhaust manifold (16); and
    an exhaust gas recirculation conduit (36) which is fluidically connected to the exhaust gas manifold (16) at a branch-off point (38) disposed downstream of the second impeller (26) and which is fluidically connected to the intake manifold (12) at an introduction point (40) disposed downstream of the first impeller (24);
    wherein in a fired operation of the internal combustion engine (10), via the exhaust gas recirculation conduit (36), at least a part of the exhaust gas flowing through the exhaust gas manifold (16) is guidable from the branch-off point (38) to the introduction point (40) and is introduced into the intake manifold 12 at the introduction point (40);
    wherein in the heating mode, wherein the internal combustion engine (10) is an idle engine in which combustion processes in the combustion chamber (14) do not take place and the output shaft is idle, at least a part of the heating medium that has been heated by the heating element (18) is guidable from the branch-off point (38) to the introduction point (40) via the exhaust gas recirculation circuit (36) functioning as a recirculation circuit of the heating medium and is guidable via the conduit element (28) through the exhaust gas turbocharger (22) from the intake manifold (12) into the exhaust manifold (16), bypassing the combustion chamber (14), and to the heating element (18) and the exhaust gas aftertreatment device (20) for heating the exhaust gas aftertreatment device (20) when the internal combustion engine (10) is the idle engine.

2. The internal combustion engine (10) according to claim 1, further comprising a valve element (34) which is disposed in the conduit element (28) and via which a quantity of the heating medium that is flowable through the conduit element (28) is adjustable.

3. The internal combustion engine (10) according to claim 1, wherein a first connection point (30) at which the conduit element (28) is fluidically connected to the intake manifold (12) is disposed upstream or downstream of the first impeller (24).

4. The internal combustion engine (10) according to claim 3, wherein a second connection point (32) at which the conduit element (28) is fluidically connected to the exhaust manifold (16) is disposed upstream or downstream of the second impeller (26).

5. The internal combustion engine (10) according to claim 1, further comprising an exhaust gas recirculation valve (42) disposed in the exhaust gas recirculation conduit (36) and via which a quantity of the exhaust gas and/or the heating medium that is flowable through the exhaust gas recirculation conduit (36) is adjustable.

6. The internal combustion engine (10) according to claim 1, further comprising a recirculation conduit (44) which is fluidically connected to the exhaust manifold (16) at a first branching point (46) disposed upstream of the second impeller (26) and is fluidically connected to the intake manifold (12) at a second branching point (48), wherein at least a part of the exhaust gas is guidable from the first branching point (46) to the second branching point (48) and is introducible into the intake manifold (12) at the second branching point (48) and/or, wherein in the heating mode, at least a part of the heating medium is guidable from the second branching point (48) to the first branching point (46) and is introducible into the exhaust manifold (16) at the first branching point (46).

7. The internal combustion engine (10) according to claim 6, wherein the second branching point (48) is disposed downstream of the first impeller (24).

8. A motor vehicle, comprising:
the internal combustion engine (10) according to claim 1.

* * * * *